United States Patent
Mogi (10) Patent No.: US 8,697,302 B2
(45) Date of Patent: Apr. 15, 2014

(54) FUEL CELL SYSTEM WITH PURGE VALVE AND ACTUATOR FOR CONTROLLING PURGE VALVE WITH ELECTROMOTIVE FORCE OF SUB-POWER GENERATION PART

(75) Inventor: Satoshi Mogi, Yamato (JP)

(73) Assignee: Canon Kabushiki Kaisha, Tokyo (JP)

( * ) Notice: Subject to any disclaimer, the term of this patent is extended or adjusted under 35 U.S.C. 154(b) by 1058 days.

(21) Appl. No.: 12/281,725

(22) PCT Filed: May 11, 2007

(86) PCT No.: PCT/JP2007/060171
§ 371 (c)(1),
(2), (4) Date: Sep. 4, 2008

(87) PCT Pub. No.: WO2007/138879
PCT Pub. Date: Dec. 6, 2007

(65) Prior Publication Data
US 2009/0011303 A1     Jan. 8, 2009

(30) Foreign Application Priority Data
May 29, 2006   (JP) .................................. 2006-148660

(51) Int. Cl.
*H01M 8/02* (2006.01)
*H01M 8/04* (2006.01)
*H01M 8/06* (2006.01)
*H01M 8/10* (2006.01)

(52) U.S. Cl.
USPC ........... 429/427; 429/408; 429/428; 429/430; 429/452; 429/457; 429/492; 429/505

(58) Field of Classification Search
USPC ........... 429/25, 439, 408, 427, 428, 430, 452, 429/457, 492, 505
See application file for complete search history.

(56) References Cited

U.S. PATENT DOCUMENTS

| | | | |
|---|---|---|---|
| 3,256,116 A | 6/1966 | Eduard et al. | |
| 6,861,167 B2 | 3/2005 | Wells et al. | |
| 6,960,401 B2 | 11/2005 | Barton et al. | |
| 7,153,598 B2 | 12/2006 | Summers et al. | |
| 2003/0022037 A1* | 1/2003 | Parr et al. | 429/22 |
| 2005/0142400 A1* | 6/2005 | Turco et al. | 429/13 |
| 2008/0145718 A1 | 6/2008 | Bette et al. | |

FOREIGN PATENT DOCUMENTS

| | | |
|---|---|---|
| JP | 2004-536438 A | 12/2004 |
| JP | 2005-085536 A | 3/2005 |
| SU | 1304683 A1 | 11/1993 |
| WO | 03/010842 A2 | 2/2003 |
| WO | 03/010845 A2 | 2/2003 |
| WO | 2004/079845 A2 | 9/2004 |
| WO | 2006/003158 A1 | 1/2006 |

OTHER PUBLICATIONS

Office Action in Japanese Application No. 2006-148660 (May 8, 2012).

* cited by examiner

*Primary Examiner* — Sean P Cullen
(74) *Attorney, Agent, or Firm* — Fitzpatrick, Cella, Harper & Scinto (57) ABSTRACT

To provide a fuel cell system capable of performing a purge operation necessary for realizing a stable output and being miniaturized without using a controller or a sensor, there is provided a fuel cell system having a main power generation part and a sub-power generation part positioned on a downstream side of a fuel flow path of the main power generation part, including: a purge valve provided on a downstream side of the fuel flow path of the sub-power generation part; and an actuator for opening/closing the purge valve with an electromotive force of the sub-power generation part.

5 Claims, 5 Drawing Sheets

FUEL CELL SYSTEM WITH PURGE VALVE AND ACTUATOR FOR CONTROLLING PURGE VALVE WITH ELECTROMOTIVE FORCE OF SUB-POWER GENERATION PART

TECHNICAL FIELD

The present invention relates to a fuel cell system, and more particularly, to a fuel cell system that is operated in a dead end mode and is capable of reducing influences of impurities accumulated in a fuel flow path upon an output of the fuel cell.

BACKGROUND ART

A fuel cell has been put into practical use, in which fuel supply spaces provided on one side of an electrolyte layer and supplied with gaseous fuel are connected in series.

Further, a flow-type fuel cell has been put into practical use, in which a plurality of fuel supply spaces are provided in a cascade pattern, in which the fuel supply spaces are connected in parallel with the number thereof decreasing gradually toward a downstream side.

According to the cascade pattern, the reduction in a flow rate on the downstream side caused by the consumption of gaseous fuel through the electrolyte membrane is compensated for. As a result, the stable supply flow rate of gaseous fuel in the fuel supply spaces can be realized from the upstream side to the downstream side.

Further, an air breathing type fuel cell has been put into practical use, in which a polymer electrolyte membrane is used as an electrolyte layer, and oxygen in the atmosphere is taken in through atmospheric communication spaces communicated with the atmosphere provided on one side of the polymer electrolyte membrane. As a result, electricity is generated by the electrochemical reaction between gaseous fuel and oxygen.

The polymer electrolyte membrane is not a completely air-tight film. Therefore, when the fuel supply spaces and the atmospheric communication spaces are provided with the polymer electrolyte membrane interposed therebetween, nitrogen in the atmosphere diffuses from the atmospheric communication spaces to the fuel supply spaces due to the concentration.

The nitrogen having entered the fuel supply spaces decreases the power generation efficiency by decreasing the partial pressure of gaseous fuel in the fuel supply spaces. Therefore, it is desirable to purge impurity gas containing nitrogen from the fuel supply spaces to the atmosphere by performing purge periodically.

In the fuel cell system of Japanese Patent Application Laid-Open No. 2004-536438, a dead end type fuel cell is shown, which includes a fuel cell stack, a purge valve, an actuator, a controller, and a sensor.

In the fuel cell stack in the fuel cell system, fuel is introduced in a cascade pattern. Therefore, during the operation of the fuel cell stack, impurities are likely to be accumulated in a purge cell portion disposed on the most downstream side.

When the impurities are accumulated in the purge cell portion, the performance of the purge cell portion degrades and the voltage of the purge cell portion is decreased.

A purge operation is performed using the following structure.

The purge valve is provided on the downstream side of the purge cell portion. In a fuel cell operated in a dead end mode, the purge valve is usually closed.

Impurities accumulated in the purge cell portion are released when the purge valve is opened.

Herein, the actuator is provided so as to open/close the purge valve.

Power is supplied to the sensor, actuator, and controller by the fuel cell stack.

The controller performs a purge operation when the sensor monitors the voltage in the purge cell portion, and the voltage in the purge cell portion decreases.

In the purge operation, the actuator opens the purge valve in response to a control signal from the controller. As a result, the impurities accumulated in the purge cell portion are released.

However, the fuel cell system shown in Japanese Patent Application Laid-Open No. 2004-536438 is not satisfactory in terms of the miniaturization.

More specifically, in the fuel cell system, in the case where the voltage in the purge cell portion is monitored with the sensor and the voltage in the purge cell portion decreases, the actuator opens the purge valve in response to the control signal from the controller. As a result, the purge operation is performed.

Therefore, the sensor for monitoring the voltage in the purge cell portion, the controller for determining purge conditions and controlling the open/close of the purge valve are required. Thus, the above-mentioned fuel cell system is not considered to be suitable for miniaturization.

DISCLOSURE OF THE INVENTION

An object of the present invention is to provide a fuel cell system capable of performing purge necessary for realizing a stable output and being miniaturized compared with a conventional example.

The present invention is directed to a fuel cell system having a main power generation part and a sub-power generation part positioned on a downstream side of a fuel flow path of the main power generation part, including: a purge valve provided on a downstream side of the fuel flow path of the sub-power generation part; and an actuator for opening/closing the purge valve with an electromotive force of the sub-power generation part.

According to the present invention, a fuel cell system can be further miniaturized without the necessity of using such a controller and a sensor as those used conventionally for a purge operation necessary for realizing a stable output.

Further features of the present invention will become apparent from the following description of exemplary embodiments with reference to the attached drawings.

BRIEF DESCRIPTION OF THE DRAWINGS

FIGS. 4A and 4B are schematic views of the fuel cell system in the example of the present invention.

BEST MODE FOR CARRYING OUT THE INVENTION

Hereinafter, a fuel cell system in an embodiment of the present invention will be described.

The fuel cell system of the present invention is structured so that an actuator for opening/closing a purge valve is driven with a power supplied by a sub-power generation part provided on a downstream side of a main power generation part.

At that time, when the electromotive force of the sub-power generation part is larger than a predetermined value, the purge valve provided on the downstream side of the sub-power generation part is closed. When the electromotive force of the sub-power generation part is smaller than the predetermined value, the purge valve provided on the downstream side of the sub-power generation part is opened.

Consequently, a fuel cell system is realized, which is operated in a dead end mode in which the purge valve provided on the downstream side of the sub-power generation part is closed, under the condition that the sub-power generation part as well as the main power generation part are supplied with sufficient fuel.

On the other hand, when impurities are accumulated in the sub-power generation part provided on the downstream side of the main power generation part during the operation of the fuel cell system, the purge valve is opened when the electromotive force of the sub-power generation part decreases, and the impurities accumulated in the sub-power generation part are released outside.

Accordingly, in the structure of this embodiment, the purge operation of the fuel cell system operated in the dead end mode can be performed autonomously even without using a sensor for monitoring a voltage and a controller for controlling the purge operation.

Consequently, a stable output can be realized by a smaller fuel cell system.

EXAMPLE

Hereinafter, the fuel cell system of an example of the present invention will be described.

Figure 1:
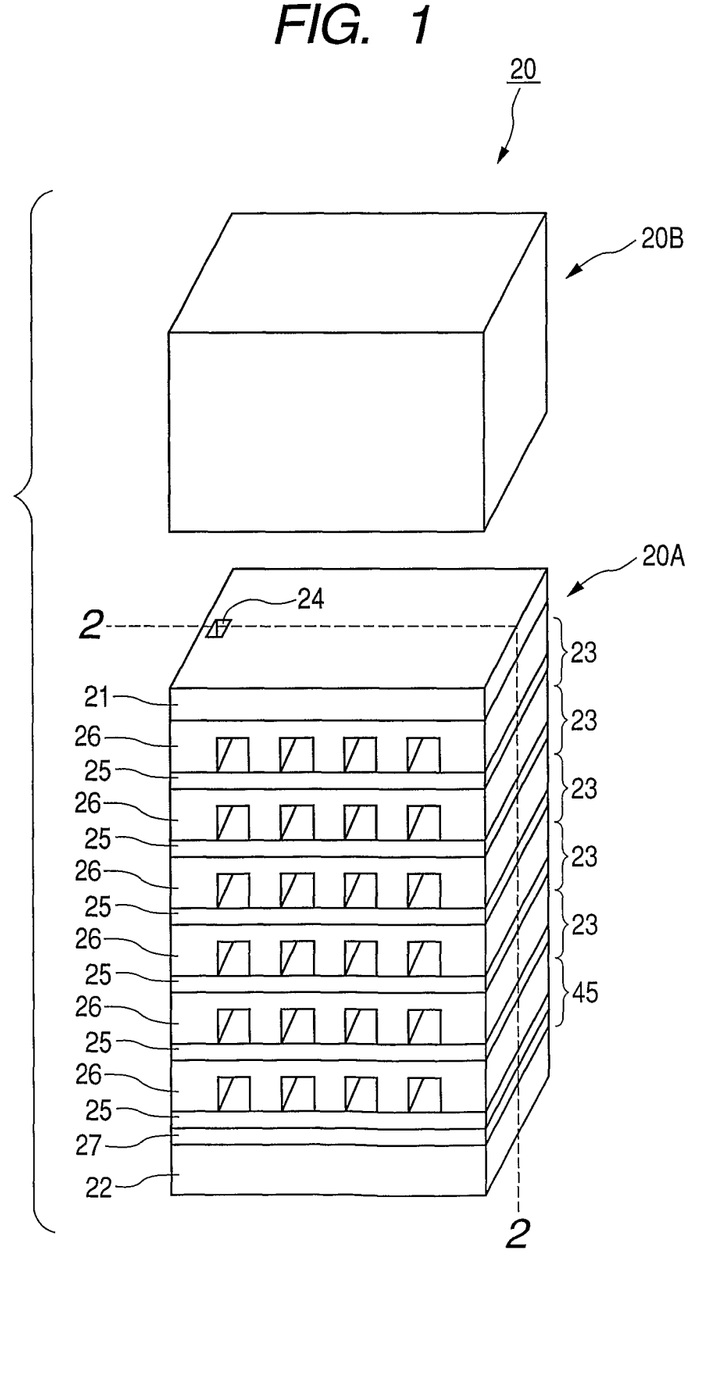
FIG. 1 is a perspective view showing a structure of a fuel cell system in an example of the present invention.
Figure 2:
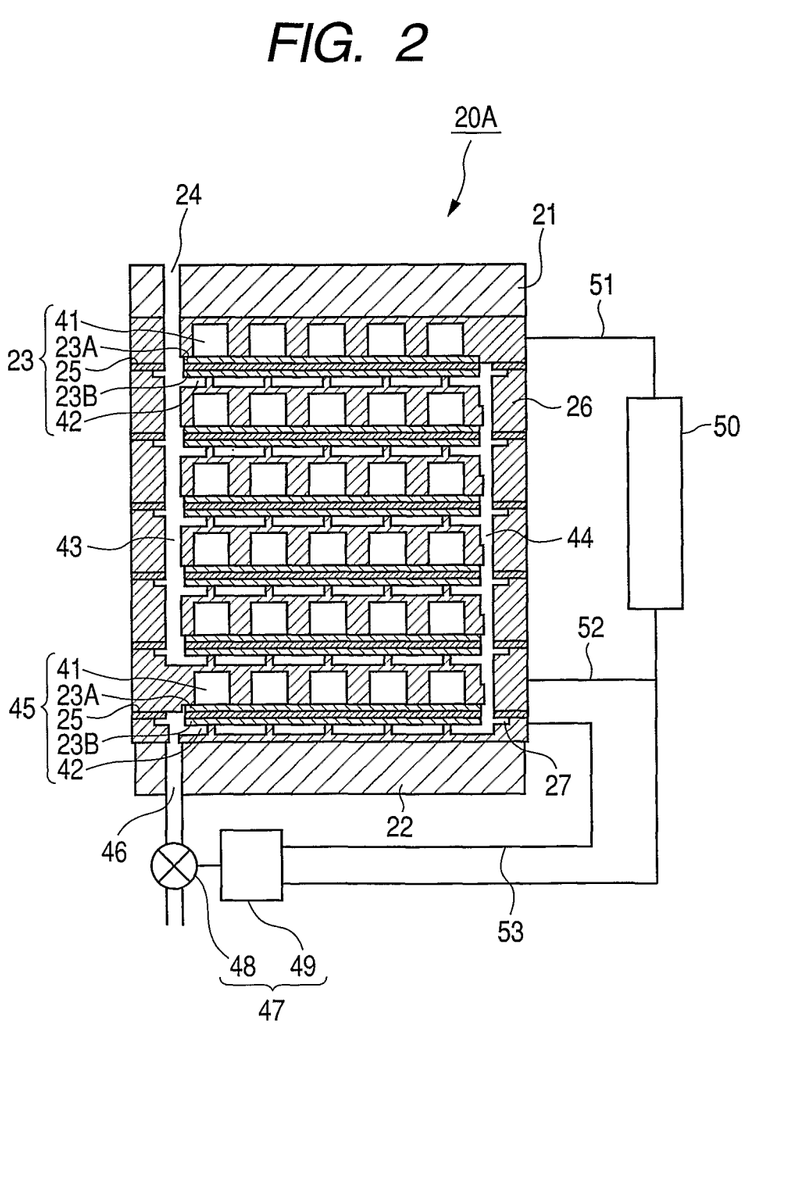
FIG. 2 is a cross-sectional view of a structure of a fuel cell stack in the example of the present invention, along the line 2-2 of FIG. 1.
Figure 3:
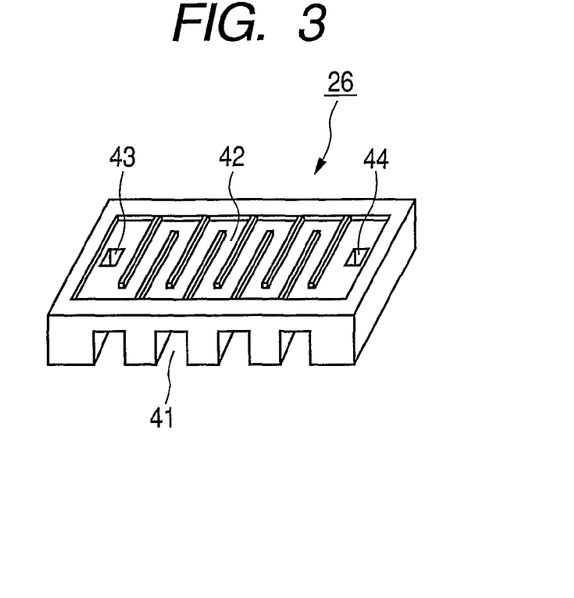
FIG. 3 is an explanatory view of a separator of a fuel cell in the example of the present invention.

FIG. 1 is a perspective view of the fuel cell system in this example. FIG. 2 is a cross-sectional view showing a structure of a fuel cell stack in this example. FIG. 3 is an explanatory view of a separator of a fuel cell in this example.

In FIGS. 1 to 3, reference numeral 20 denotes a fuel cell system; 20A, a fuel cell stack; 20B, a fuel tank; 21 and 22, end plates; 23, power generation cells of the main power generation part (main power generation cells) positioned on the upstream side; 23A and 23B, gas diffusion layers; 24, a fuel flow path inlet; and 25, membrane electrode assemblies.

Reference numeral 26 denotes separator members (separators); 27, a flow path plate; 41, atmospheric communication spaces (oxidizer flow paths); 42, fuel supply spaces (fuel flow paths); 45, a power generation cell of the sub-power generation part (sub-power generation cell) positioned on the downstream side; 47, a purge valve; 48, a valve; and 49, an actuator.

As shown in FIG. 1, the fuel cell system 20 is assembled by detachably connecting the fuel cell stack 20A to the fuel tank 20B.

The fuel cell stack 20A has a structure in which a plurality of power generation cells including the main power generation cells 23 positioned on the upstream side and the sub-power generation cell 45 positioned on the downstream side are stacked between a pair of end plates 21 and 22.

The fuel tank 20B is filled with hydrogen gas and supplies hydrogen gas adjusted to a required pressure to the fuel cell stack 20A.

The end plate 21 is provided with the fuel flow path inlet 24 that is connected to the fuel tank 20B to supply hydrogen gas to the fuel cell stack 20A.

The membrane electrode assembly 25 has a structure in which catalyst layers dispersed platinum fine particles are formed on upper and lower surfaces of a polymer electrolyte membrane, and the catalyst layer on the upper surface in the figure is an oxidizer electrode and the catalyst layer on the lower surface thereof is a fuel electrode. The plurality of membrane electrode assemblies 25 is stacked via the separators 26.

As shown in FIG. 2, each of the gas diffusion layers 23A and 23B is provided between the membrane electrode assembly 25 and the separator 26. Each of the gas diffusion layers 23A and 23B is made of a sheet material having conductivity which transmits a reactant such as carbon cloth.

Oxygen in the atmosphere enters the main power and sub-power generation cells 23 and 45 in each stage in a direction perpendicular to the drawing surface via the oxidizer flow paths 41 provided in the separators 26, and diffuses over the entire upper surface of the membrane electrode assemblies 25 through the gas diffusion layers 23A.

Hydrogen gas is supplied to a supply-side main flow path 43 on the left side of the figure through the fuel flow path inlet 24, and is divided from the supply-side main flow path 43 to be distributed to the fuel flow path 42 in each stage.

The supply-side main flow path 43 is formed by superimposing through-holes provided in the separators 26.

In the catalyst layer of the membrane electrode assembly 25 in contact with the gas diffusion layer 23B, hydrogen gas is decomposed to hydrogen ions and electrons due to the catalytic reaction, and hydrogen ions are supplied to the polymer electrolyte membrane.

In the catalyst layer of the membrane electrode assembly 25 in contact with the gas diffusion layer 23A, due to the catalytic reaction, oxygen is chemically combined with the hydrogen ions supplied from the polymer electrolyte membrane to generate water molecules. The polymer electrolyte membrane of the membrane electrode assembly 25 moves the hydrogen ions from the gas diffusion layer 23B side to the gas diffusion layer 23A side. Along with the electrochemical reaction, electrons become excessive on the gas diffusion layer 23B side, and a potential difference is caused between the gas diffusion layers 23A and 23B. The electrons can move to the gas diffusion layer 23A side via an external circuit. As a result, the power generation cells generate an electromotive force.

The fuel flow path 42 of the main power generation cell 23 in each stage is combined with the discharge-side main flow path 44 on the downstream side (right side in the figure), and the discharge-side main flow path 44 is connected to the fuel flow path 42 of the sub-power generation cell 45 on the downstream side.

The downstream side of the fuel flow path 42 of the sub-power generation cell 45 is connected to a fuel flow path outlet 46 of the end plate 22, and the purge valve 47 is provided to the fuel flow path outlet 46. As the purge valve in this embodiment, an electric driving valve can be used in which a valve structure body (valve) 48 and a device (actuator) 49 electrically driving the valve structure body 48 function integrally. As the purge valve 47, a normally open type on-off valve can be used, which is closed during an energized state and opened during a non-energized state.

As described later, the purge valve 47 is closed during a normal operation of the fuel cell, and is opened during discharge of impurity gas. Since the purge valve 47 is closed during a normal operation of the fuel cell, the fuel cell stack 20A serves as a dead end type fuel cell. The dead end type fuel cell generally has no outlet in a fuel path, and the supplied fuel is completely consumed basically. The fuel cell stack 20A with such a structure does not require piping and a pump for fuel circulation, and hence is suitable for miniaturization of the fuel cell system 20.

As shown in FIG. 3, on the surface (lower side in the figure) of the separator 26, the oxidizer flow paths 41 which are grooves arranged in parallel are formed. Each of the oxidizer flow paths 41 supplies oxygen in the atmosphere to the oxidizer electrode of the membrane electrode assembly 25 through the gas diffusion layer 23A, as shown in FIG. 2.

Further, as shown in FIG. 3, on the reverse surface (upper side in the figure) of the separator 26, the fuel flow path 42 in a zigzag shape is formed. As shown in FIG. 2, the fuel flow path 42 supplies hydrogen gas to the fuel electrode of the membrane electrode assembly 25 through the gas diffusion layer 23B.

Further, as shown in FIG. 3, at the end of the separator 26, supply-side main flow path 43 for guiding hydrogen gas supplied through the fuel flow path inlet 24 of FIG. 2 to the main power generation cell 23 in each stage is provided.

The fuel cell stack 20A is of an atmospheric open type with the oxidizer electrode opened to the atmosphere, so that a main component of the impurity gas entering the fuel flow path 42 is nitrogen gas contained in air.

In the fuel cell stack 20A, nitrogen gas diffuses from the oxidizer electrode with a nitrogen gas partial pressure of about 80 kPa to the fuel flow path 42 with a nitrogen gas partial pressure of about 0 Pa mainly through the membrane electrode assembly 25 due to the concentration diffusion.

In the fuel cell stack 20A in this example, due to the structure of the fuel flow paths connected in series, impurity gas is concentrated and accumulated in the fuel flow path 42 of the sub-power generation cell 45 on the downstream side.

Due to the flow of the hydrogen gas formed in the main power generation cell 23 on the upstream side, the concentration of impurity gas in the fuel flow path 42 of the main power generation cell 23 is higher toward the downstream side.

The hydrogen gas with the concentration of impurity gas increased in the main power generation cell 23 flows to the sub-power generation cell 45 on the downstream side through the discharge-side main flow path 44.

The concentration of impurity gas at the inlet of the fuel flow path 42 of the sub-power generation cell 45 and the concentration of impurity gas in the discharge-side main flow path 44 are balanced.

The membrane electrode assembly 25 of the sub-power generation cell 45 takes in hydrogen gas, leaving impurity gas. Therefore, a flow of hydrogen gas directed to the downstream side is formed also in the sub-power generation cell 45, and the concentration of impurity gas is higher toward the downstream side.

Consequently, impurity gas of high concentration is accumulated in the fuel flow path 42 of the sub-power generation cell 45. The impurity gas in the fuel flow path 42 of the sub-power generation cell 45 tends to diffuse to the upstream side in the fuel flow path 42 driven by the difference in concentration. However, the hydrogen gas flowing in the fuel flow path 42 of the sub-power generation cell 45 hinders the diffusion, and the flow of the hydrogen gas in the fuel flow path 42 blows the impurity gas to the downstream side. As a result, the high concentration of impurity gas is kept.

In a structural example of this example, as shown in FIG. 2, power is taken out independently from two places, that is, a main power generation part in which N-stages of the main power generation cells 23 positioned on the upstream side are connected in series and a sub-power generation part of the sub-power generation cells 45 positioned on the downstream side in the fuel cell stack 20A. Herein, N is a natural number, and N=5 in the example shown in FIG. 2.

Figure 4A:
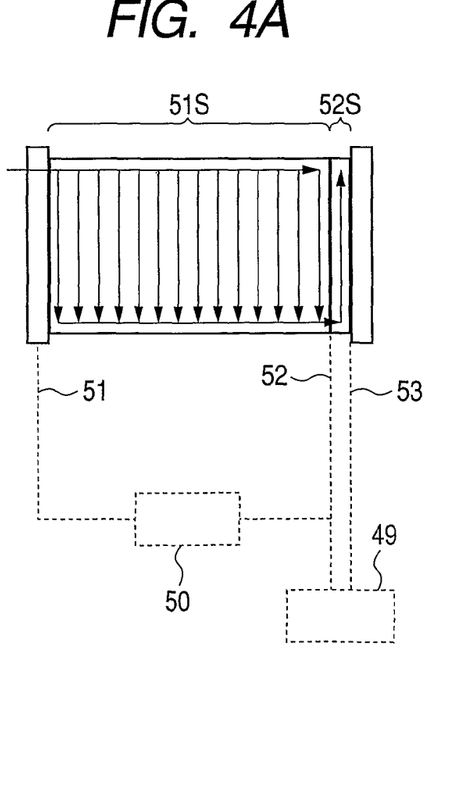
FIG. 4A is a view illustrating a structural example of opening/closing a purge valve by operating an actuator with an electromotive force of a sub-power generation part.

At this time, as shown in FIG. 4A, the actuator 49 is activated with the electromotive force of the sub-power generation part. As a result, the purge valve 47 is opened/closed.

In the present invention, the main power generation part and the sub-power generation part are connected so that power can be taken out independently, and the portion provided on the upstream side in the fuel flow path is referred to as a main power generation part and the portion provided on the downstream side thereof is referred to as a sub-power generation part, irrespective of the magnitude of the power generation ability.

In the structural example, a main power generation part 51*s* includes N power generation cells positioned on the upstream side of the fuel flow path, and a sub-power generation part 52*s* includes a power generation cell positioned on the downstream side thereof.

Then, an output voltage of the main power generation part is taken out between an upstream-side terminal member 51 and a downstream-side terminal member 52 in the main power generation part shown in FIG. 2, and an output voltage of the sub-power generation part is taken out between the downstream-side terminal member 52 and a terminal member 53 of the sub-power generation part.

During the use of the fuel cell, i.e., during the normal operation, an external load 50 is connected to the main power generation part 51*s*. That is, as shown in FIG. 2, the external load 50 is connected to the upstream-side terminal member 51 and the downstream-side terminal member 52 in the main power generation part, and the external load 50 is supplied with power.

At this time, the fuel cell may be connected to the main power generation part 51*s* via a circuit such as a DC-DC converter required for satisfying a voltage request of the external load 50.

The downstream-side terminal member 52 of the main power generation part and the terminal member 53 of the sub-power generation part are connected to the actuator 49 that opens/closes the purge valve 47.

The purge valve 47 is of a normally open type, which opens a flow path between the inlet port and the outlet port of the valve 48 when sufficient power is not supplied to the actuator 49. Further, when power equal to or more than required power (threshold power) for the operation of the actuator 49 is supplied to the actuator 49 from the sub-power generation part 52*s*, the flow path is closed.

The threshold value at which the purge valve is opened/closed can be selected appropriately based on the structure of the actuator 49.

Further, a cell area/a cell number of the sub-power generation part can also be selected appropriately in accordance with the threshold value at which the purge valve is opened/closed.

The sub-power generation part may be composed of one downstream-side power generation cell or a plurality of power generation cells including the power generation cell on the downstream side.

As the driving system of the purge valve, an electromagnetic valve using a solenoid, a motor valve using a motor, a driving valve using a piezoelectric element can be used.

Further, due to the recent drastic development of the technology, a smaller electric driving valve, i.e., an electric driving valve with low power consumption using a fine processing technique has been developed, and it is also considered to use such a valve.

Figure 4B:
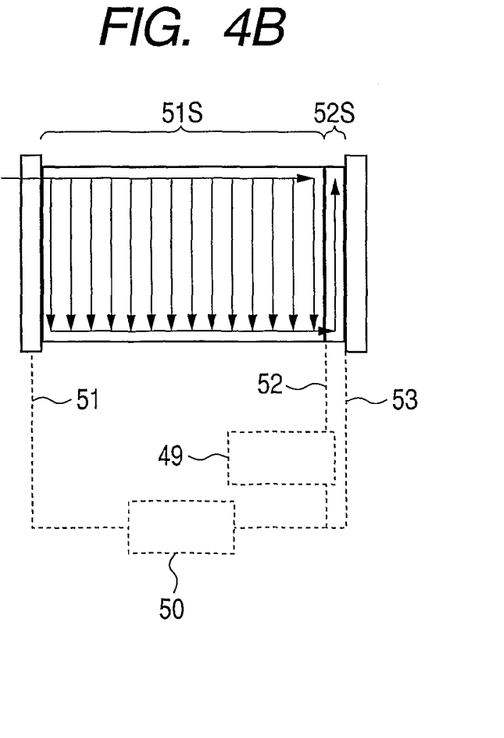
FIG. 4B is a view illustrating a structural example of operating an actuator of a purge valve formed of an electric driving valve with power of the sub-power generation part supplied to an external load.

In the case of using such an electric driving valve with lower power consumption, a structural example shown in FIG. 4B can be adopted. More specifically, at the same time of the activation of the actuator of the purge valve with the power of the sub-power generation part, the power of the sub-power generation part is supplied to the external load 50.

In this structural example, the external load 50 is connected to the main power generation part 51s and the sub-power generation part 52s so that the external load 50 is supplied with power therefrom.

The sub-power generation part 52s is connected to the actuator 49 of the purge valve 47 separately, and the electric driving valve constituting the actuator 49 is activated with the electromotive force of the sub-power generation part 52s. As a result, the purge valve is opened/closed.

At this time, the threshold value at which the purge valve is opened/closed is set to a value lower than the electromotive voltage of the sub-power generation part at the current supplied to the external load 50 by the fuel cell stack during a normal operation.

Figure 5A:
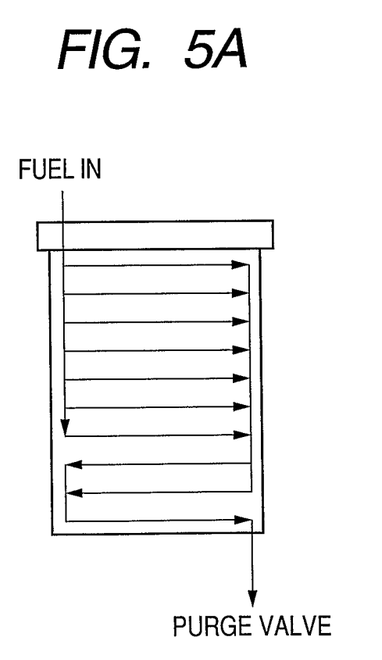
FIGS. 5A and 5B are explanatory views of a connection pattern of a fuel flow path in the fuel cell in the example of the present invention.
Figure 5B:
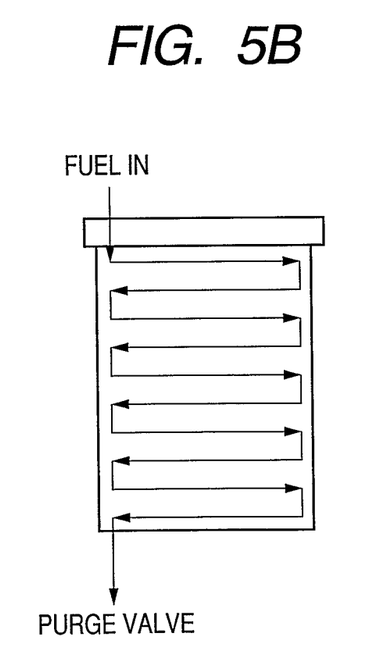

The fuel flow path 42 in the fuel cell stack 20A shown in FIG. 2 is of a cascade pattern shown in FIG. 5A. However, the fuel flow path of the present invention is not limited to such a structure, and may be of a serial pattern shown in FIG. 5B.

When the fuel tank 20B starts supplying fuel to the fuel cell stack 20A, impurities in the fuel flow path are pushed out from the upstream side to the downstream side of the fuel flow path, and are released out of the fuel flow path by the purge valve which is open.

Thus, the impurities in the fuel flow path are replaced by fuel successively in the order of the fuel flow path in the main power generation part and the fuel flow path in the sub-power generation part.

When the impurities in the fuel flow path of the sub-power generation part are replaced by fuel, and the power supplied to the actuator by the sub-power generation part exceeds the threshold value, the purge valve is closed. Because of this, the fuel cell stack 20A is operated in a dead end type.

When impurities are accumulated in the sub-power generation part during the operation of the fuel cell, power generation of the sub-power generation part is hindered by the influence of the impurities as described above.

When the power supplied from the sub-power generation part to the actuator decreases to be less than the threshold value, the purge valve is opened.

When the purge valve is opened, the impurities accumulated in the sub-power generation part are released outside from the fuel flow path through the purge valve.

When the impurities in the sub-power generation part are replaced by fuel, and the power supplied to the actuator by the sub-power generation part exceeds the threshold value, the purge valve is closed again.

As described above, according to the fuel cell system in this example, the impurities in the fuel flow path can be replaced by fuel during the start of the supply of fuel to the fuel cell stack or during the operation of the fuel cell.

Figure 6A:
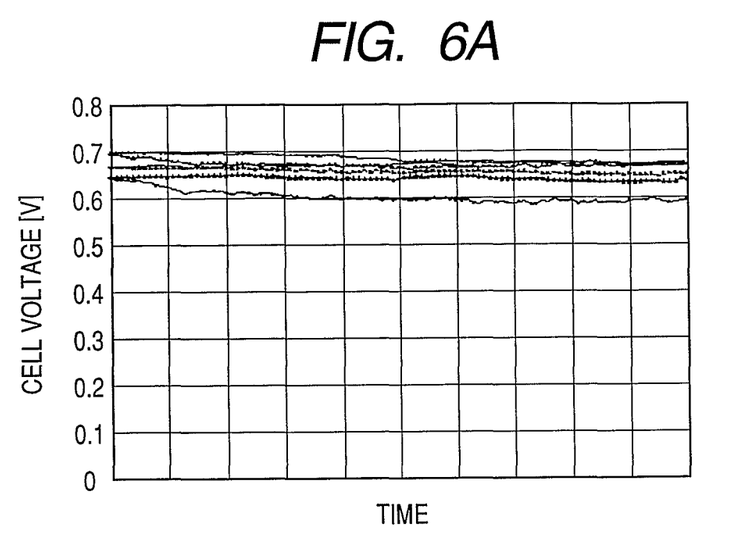
FIGS. 6A and 6B are explanatory views of a purge operation of the fuel cell system in the example of the present invention.
Figure 6B:
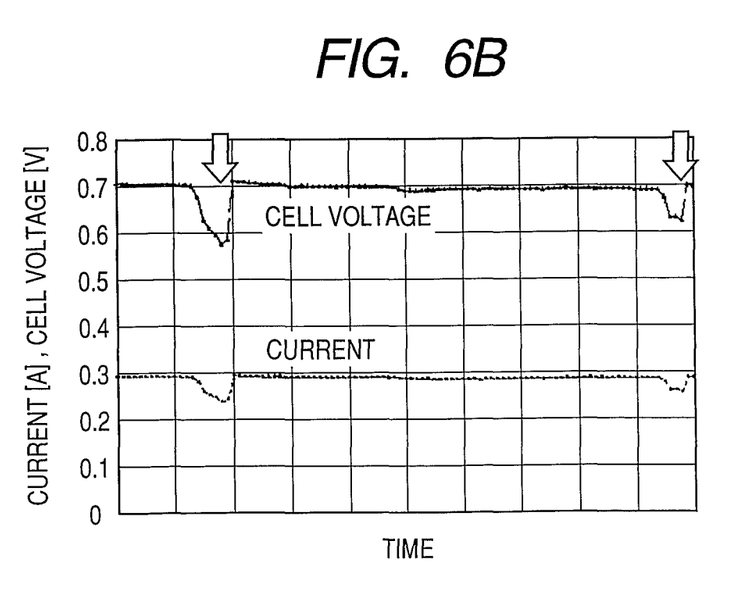

Next, the purge operation in this example will be described.
FIGS. 6A and 6B are views illustrating the purge operation in this example.

FIG. 6A is a diagram showing an output voltage of each main power generation cell 23 of the main power generation part 51s when the fuel cell stack 20A is connected to the external load 50 as shown in FIG. 4A.

Further, FIG. 6B is a diagram showing an output voltage of the sub-power generation cell 45 of the sub-power generation part 52s and a current flowing through the actuator 49 of the purge valve 47 connected to the sub-power generation part 52s. The purge valve used in this example is a small valve using a shape-memory alloy for the actuator.

The operation current is 250 mA in a normally open type. Therefore, the area of the power generation cell in the sub-power generation part is set to be 1 cm$^2$ and the number of power generation cells is set to be one so that a current of 250 mA or more can be supplied to the actuator.

When the sub-power generation part is connected to the actuator to supply hydrogen, the electromotive voltage of the sub-power generation part is 0.7 V, and a current of 300 mA flows to the actuator. Thus, power generation is realized in a dead end mode with the purge valve closed.

When the fuel cell system 20 is connected to the external load 50 to generate power in this state, the decrease in an output of the sub-power generation cell 45 of the sub-power generation part 52s is observed as represented by the arrows shown in FIG. 6B.

The decrease in an output is caused by the accumulation of impurity gas. When the output of the sub-power generation part decreases less than the threshold value of the purge valve (herein, less than 0.6 V (0.25 A)), the purge valve is opened.

Because of this, impurity gas is released from the purge valve, and the output of the sub-power generation part 52s is recovered. As a result, the purge valve is closed. During the purge operation, the output voltage of the main power generation cell 23 of the main power generation part 51s is stable.

More specifically, the influence of impurity gas in the main power generation part 51s can be prevented.

Thus, in the fuel cell system 20 in this example, the output in the sub-power generation part 52s is connected to the actuator of the purge valve. As a result, the purge valve is opened/closed automatically when a predetermined amount of impurity gas is accumulated in the sub-power generation cell 45. This enables most of the impurity gas in the fuel cell stack 20A to be purged.

Thus, the fuel cell stack 20A returns to the state immediately after the previous purge operation, so that the fuel cell stack 20A can continue to supply stable electromotive force to the fuel cell mounted system.

The threshold value of the purge valve is determined appropriately depending upon the structure and size of the fuel cell, and can be determined by the following method. After purge is performed with respect to the fuel cell, the electromotive forces of the main power generation part and the sub-power generation part of the fuel cell are measured under the condition that the fuel cell is connected a load that is generally assumed, such as a notebook personal computer. A lowest value of the electromotive force of the sub-power generation part that is fluctuated along with the fluctuation of the load due to the operation of the notebook personal computer is obtained. The threshold value is determined so that purge is performed when the fluctuation appears, which is two-fold, preferably three-fold of the fluctuation width from the electromotive force during no load to the lowest value. It is necessary to confirm that the electromotive force of the main power generation part does not decrease at this time. As the threshold value is set to a value smaller within a range in which the electromotive force of the main power generation part does not decrease, unnecessary execution of purge by a malfunction can be suppressed.

According to this example, the purge operation of the dead end type fuel cell stack can be performed under autonomous control without using a sensor and a controller, so that the fuel cell system can be miniaturized.

As described above, according to the fuel cell system of this example, the purge valve capable of being opened/closed with the electromotive force of the sub-power generation part can be used. Therefore, a sensor for monitoring the power generation state of the fuel cell stack and a controller for controlling the execution of the purge operation are not necessary.

Therefore, the cost required for setting a sensor or a controller can be reduced, and moreover, the possibility that the operation of the fuel cell becomes unstable due to the failure of the sensor or controller can be decreased. Further, a purge operation can be performed autonomously with the electromotive force of the sub-power generation part driven under the conditions substantially equal to the operation conditions of the main power generation part. Therefore, even in the case where the degree of accumulation of impurities in the main power generation part changes due to the variation in external environment such as temperature and humidity, a purge operation can be controlled exactly compared with the conventional control method.

Consequently, power can be supplied to the external load stably, and simultaneously, the reduction in cost and miniaturization of the fuel cell system can be performed.

The fuel cell of the present invention is not limited to the structure of the example as described above.

As long as gaseous fuel is supplied to the fuel supply spaces of the power generation cells to generate power, the fuel cell of the present invention can be realized in another embodiment in which a part of or the entire structure of the above example is replaced by an alternative structure.

Further, in this example, a structural example of generating power using hydrogen gas stored in a fuel tank has been described. Alternatively, liquid fuel such as methanol containing hydrogen atoms may be stored in the fuel tank, reformed with hydrogen gas only by the required amount, and supplied to the fuel supply spaces of the power generation cells.

Further, the fuel cell system of the present invention can also be embodied as an independent unit removably attached to a portable electronic appliance such as a digital camera, a digital video camera, a projector, a printer or a notebook personal computer.

Further, the fuel cell system of the present invention can also be embodied in a case where only the power generation part of the fuel cell system is incorporated into an electronic appliance and a fuel tank is attached/detached.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-148660, filed May 29, 2006, which is hereby incorporated by reference herein in its entirety.

The invention claimed is:

1. A fuel cell system including a main power generation part and a sub-power generation part positioned on a downstream side of a fuel flow path of the main power generation part, comprising:
   a purge valve provided in the fuel flow path downstream of the sub-power generation part; and
   an actuator configured to open/close the purge valve with an electromotive force of the sub-power generation part,
   wherein the purge valve is a normally open valve, which is configured to be operated autonomously by the electromotive force of the sub-power generation part.

2. The fuel cell system according to claim 1, wherein the actuator is configured to close the purge valve when the electromotive force of the sub-power generation part is a set value or more, and is configured to open the purge valve when the electromotive force of the sub-power generation part is less than the set value.

3. The fuel cell system according to claim 1, wherein the actuator is configured to close the purge valve when the electromotive force of the sub-power generation part supplied to an external load connected to the main power generation part and the sub-power generation part is a set value or more, and is configured to open the purge value when the electromotive force of the sub-power generation part supplied to the external load is less than the set value.

4. The fuel cell system according to claim 3, wherein a threshold value at which the purge valve is opened/closed by the actuator is set to a value lower than the electromotive force of the sub-power generation part during a normal operation.

5. The fuel cell system according to claim 1, wherein the main power generation part includes a fuel cell stack in which at least two fuel cells are stacked and connected in series.

* * * * *